(12) United States Patent
Suciu et al.

(10) Patent No.: US 9,760,926 B2
(45) Date of Patent: Sep. 12, 2017

(54) ON DEMAND INFORMATION NETWORK

(75) Inventors: Dominic Dan Suciu, Edmonds, WA (US); Patrick John Ennis, Fall City, WA (US); Alexander Knight, Seattle, WA (US); Vlad Grigore Dabija, Mountian View, CA (US); Timothy Martin Londergan, Seattle, WA (US); David Walter Ash, Bellevue, WA (US); Raghuram Madabushi, Seattle, WA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 206 days.

(21) Appl. No.: 13/810,818

(22) PCT Filed: Jun. 14, 2012

(86) PCT No.: PCT/US2012/042425
§ 371 (c)(1),
(2), (4) Date: Jan. 17, 2013

(87) PCT Pub. No.: WO2013/187900
PCT Pub. Date: Dec. 19, 2013

(65) Prior Publication Data
US 2013/0339175 A1    Dec. 19, 2013

(51) Int. Cl.
*G06Q 30/00* (2012.01)
*G06Q 30/06* (2012.01)
*H04M 15/00* (2006.01)

(52) U.S. Cl.
CPC ...... *G06Q 30/0611* (2013.01); *H04M 15/805* (2013.01)

(58) Field of Classification Search
CPC .......................................... G06Q 30/06–30/08
(Continued)

(56) References Cited

U.S. PATENT DOCUMENTS 7,840,539 B2    11/2010 Mooney et al.
2002/0062276 A1    5/2002 Krueger et al.
(Continued)

FOREIGN PATENT DOCUMENTS

JP    2003530641 A    10/2003
KR    1020040073265 A    8/2004
(Continued)

OTHER PUBLICATIONS

International Search Report from International Application No. PCT/US12/042425 mailed Oct. 2, 2012.
(Continued)

*Primary Examiner* — Ethan D Civan
(74) *Attorney, Agent, or Firm* — Brundidge & Stanger, P.C.

(57) ABSTRACT

In one example, a user interface may be configured to receive input from a hosting device, a transmitter may be configured to solicit competing bids to subscribing devices for a requested service based on the input from the hosting device, a queue may be configured to store bids from third-parties in response to the transmitted request for bids for the requested service, and a receiver may be configured to receive a manifestation of the requested service from one of the third-parties whose received bid was accepted.

14 Claims, 6 Drawing Sheets

(58) Field of Classification Search
USPC .............................................. 705/26.1–27.2
See application file for complete search history.

(56) References Cited

U.S. PATENT DOCUMENTS

| | | |
|---|---|---|
| 2003/0004855 A1 | 1/2003 | Dutta et al. |
| 2007/0208652 A1 | 9/2007 | Whelchel et al. |
| 2008/0098316 A1 | 4/2008 | Declan |
| 2009/0177555 A1* | 7/2009 | Milgrom .......................... 705/26 |
| 2009/0222345 A1* | 9/2009 | Greene ............................ 705/14 |
| 2010/0082472 A1* | 4/2010 | Cheung ........................... 705/37 |
| 2010/0250581 A1 | 9/2010 | Chau |
| 2010/0332262 A1* | 12/2010 | Horvitz et al. ................... 705/4 |
| 2011/0117928 A1 | 5/2011 | Barresse et al. |
| 2012/0084171 A1 | 4/2012 | Adair et al. |
| 2015/0012376 A1* | 1/2015 | Grove et al. ................ 705/26.3 |

FOREIGN PATENT DOCUMENTS

| | | |
|---|---|---|
| KR | 1020060074320 A | 7/2006 |
| KR | 100836214 B1 | 6/2008 |
| KR | 1020090023674 A | 3/2009 |
| WO | 0177863 A2 | 10/2001 |
| WO | 2005076179 A1 | 8/2005 |
| WO | 2007144705 A1 | 12/2007 |
| WO | 2008024723 A2 | 2/2008 |

OTHER PUBLICATIONS

"Teliport.me Building a Crowdsourced Streetview with Their 360 Panorama App" by Vikas SN, Aug. 6, 2011, 3pgs.

Shankland, S., "Google crowdsources Street View imagery," accessed at http://www.cnet.com/news/google-crowdsources-street-view-imagery/, updated on Feb. 27, 2009, pp. 3.

* cited by examiner

ON DEMAND INFORMATION NETWORK

CROSS-REFERENCE TO RELATED APPLICATION

This application is a U.S. National Stage filing under 35 U.S.C. §371 of International Application No. PCT/US12/42425, filed on Jun. 14, 2012, entitled "ON DEMAND INFORMATION NETWORK," the disclosure of which is incorporated herein by reference in its entirety.

TECHNICAL FIELD

The embodiments described herein pertain generally to soliciting bids and resulting services from a network of subscribers.

BACKGROUND

With the advent of online services has come myriad free services that include street views of a desired address, restaurant reviews that include past customer reviews, or even real-time coverage, commentary, and media from a news-worthy event, e.g., by Facebook®, Twitter®, Google+®, etc. Such information, whether queued or real-time, is made available with the click of a mouse or a tap of a touch-screen by an online viewer using a device having a data connection to a network, i.e., the Internet.

SUMMARY

In one example embodiment, a computer-readable medium stores computer-executable components that comprise, at least, a user interface configured to receive input from a hosting device, a transmitting component configured to solicit competing bids from subscribing devices for a requested service based on the input from the hosting device, a queuing component configured to store bids from one or more of the subscribing devices in response to the transmitted request for bids for the requested service, and a receiving component configured to receive a manifestation of the requested service from one of the subscribing devices of which the received bid was accepted.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Figure 1:
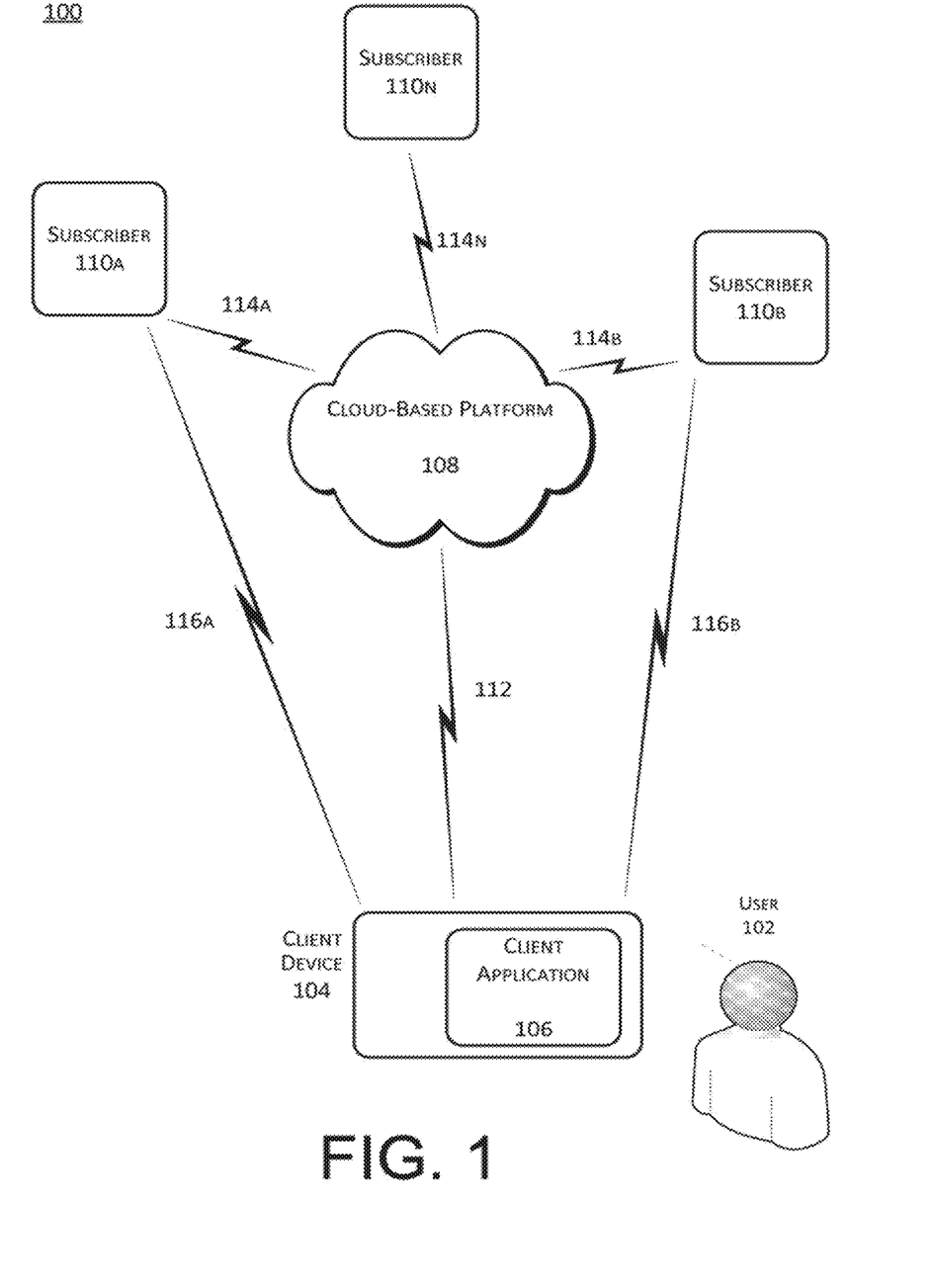
FIG. 1 shows an example configuration of an on-demand information network, arranged in accordance with at least some embodiments described herein.

FIG. 1 shows an example configuration of an on-demand information network 100, arranged in accordance with at least some embodiments described herein. As depicted, on-demand information network 100 includes, at least, a client device 104 with an instance of a client application 106 hosted thereon, a cloud-based platform 108, and multiple subscribing devices 110A, 110B, . . . , 110N. A user 102 is illustrated as an entity who exercises ownership or control of client device 104.

User 102 may be a person who desires to receive real-time data, information, and/or media files from subscribers to a service hosted by cloud-based platform 108. Alternatively, user 102 may represent organizations, entities, or communities that represent a common interest, therefore leading to a solicitation for one or more bids for services, as described herein. Such examples are not intended to be limiting, and even further alternatives may be contemplated within the spirit and context of this description.

More particularly, utilizing the infrastructure of configuration 100, user 102 may solicit bids for, and subsequently receive services that may include, as examples only, on-demand data, information, and/or media files. Non-limiting examples of the data, information, and/or media files pertaining to the requested services, as referenced throughout the present description, may include descriptive texts, photographs, and/or videos of, e.g., street views of a particular address; restaurant reviews, including real-time information regarding current capacity, daily specials, etc., crowd views; weather at a particular location; etc. The menu of such potential requested services may be myriad, and may delve into the categorization of on-demand journalism, customized reporting, tailored data retrieval, etc. Regardless of the requested service, user 102 and a service provider of cloud-based platform 108, either singularly or in combination, may utilize on-demand information network 100 to facilitate a bidding system to procure on-demand, real-time data, information, and/or media files that are to be captured on terms specified by and for user 102.

Client device 104 may refer to a processor-based electronic device on which an instance of client application 106 may be hosted to implement at least portions of an on-demand information network. Further, client device 104 may be configured to transmit and receive data, information, and/or media files over a radio link to cloud-based platform 108 by further connecting to a mobile communications network provided by a wireless service provider (not shown). Client device 104 may be implemented as a portable (or mobile) electronic device such as a mobile phone, cell phone, smartphone, personal data assistant (PDA), a personal media player device, an application specific device, or a hybrid device that includes any of the above functions. Client device 104 may also be implemented as a personal computer including tablet, laptop computer, and non-laptop computer configurations, which may be connected to the aforementioned mobile communications network or, alternatively, to a wired network.

The aforementioned wireless service provider for implementing communications for client device 104 may also be known as a mobile network carrier, wireless carrier, or even cellular company. Regardless of the alternate reference, the wireless service provider may provide services for mobile communications subscribers. Client device 104 may be configured to communicate with any of cloud-based platform 108 and/or subscribers 110A, 110B, . . . , 110N, who may similarly communicate with each other and/or cloud-based platform 108. Further, client device 104 may be configured to communicate with any of subscribers 110A, 110B, . . . , 110N directly in a peer-to-peer networking environment.

Client application 106 may be hosted on, or otherwise associated with, client device 104. Client application 106 may facilitate user interaction with at least cloud-based platform 108 or another data center within the infrastructure of on-demand information network 100 for client device 104.

More particularly, client application 106, in coordination with cloud-based platform 108, may submit or configure conditions, preferences, or settings entered by user 102 for soliciting competing bids from multiple ones of subscribers 110A, 110B, . . . , 110N for a requested service, i.e., data, information, and/or media files. The conditions for the solicitation of bids for the requested services may include, as non-limiting examples, a requested form of data, information, and/or media files; a location in which to capture the data, information, and/or media files; a time frame in which to capture the data, information, and/or media files; other forms of context for the requested data, information, and/or media files; a price range willing to be paid for the requested data, information, and/or media files; a time frame within which the solicited bids will be accepted, etc.

Cloud-based platform 108 may be regarded as a cloud-based storage and dissemination platform owned and/or operated by a third-party service provider. Cloud-based platform may include a framework of hardware, software, firmware, or any combination thereof, to which digital data and information, including media files, may be stored or from which they may be shared with subscribers to the hosted service. More particularly, cloud-based platform 108 may be implemented as a web-based storage and sharing service to which user 102, as well as subscribers 110A, 110B, . . . , 110N (i.e., the people to which the respective devices belong) register prior to use. Such registration may include pre-configuration of user preferences or settings for soliciting or contributing data, information, and/or media files on digital storage platform 108. The registration, including pre-configuration of user conditions, preferences, or settings, may be performed in coordination with the instance of client application 106 hosted on client device 104.

Subscribers 110A, 110B, . . . , 110N may refer to a processor-based electronic device configured to transmit and receive data, information, and/or media files over a radio link to cloud-based platform 108 by further connecting to a mobile communications network provided by a wireless service provider (not shown). Similar to client device 104, subscribers 110A, 110B, . . . , 110N may be implemented as a portable (or mobile) electronic device such as a mobile phone, cell phone, smartphone, personal data assistant (PDA), a personal media player device, an application specific device, or a hybrid device that includes any of the above functions. Further, since subscribers 110A, 110B, . . . , 110N may be utilized to provide requested services, e.g., data, information, and/or media files to client device 104 via cloud-based platform 108, subscribers 110A, 110B, . . . , 110N may further be configured to include a camera, video recorder, and/or audio recorder. Alternatively, subscribers 110A, 110B, . . . , 110N may be configured with a port to have a separate camera, video recorder, and/or audio recorder communicatively coupled thereto. Non-limiting examples of such ports may include a USB port, HDMI port, etc. Further still, one or more of subscribers 110A, 110B, . . . , 110N may also be implemented as a personal computer including tablet, laptop computer and non-laptop computer configurations, which may be connected to the aforementioned mobile communications network or, alternatively, to a wired network.

Subscribers 110A, 110B, . . . , 110N may also be configured to transmit/receive data or information or otherwise share information utilizing non-cellular technologies such as conventional analog AM or FM radio, Wi-Fi™, wireless local area network (WLAN or IEEE 802.11), WiMAX™ (Worldwide Interoperability for Microwave Access), Bluetooth™, hard-wired connections, e.g., cable, phone lines, and other analog and digital wireless voice and data transmission technologies. Further still, client device 104 may be configured to communicate with any of subscribers 110A, 110B, . . . , 110N directly in a peer-to-peer networking environment.

Communication link 112 may refer to a communication link enabled by a protocol utilized to transmit data, information, and/or media files between client application 106, via client device 104, and cloud-based platform 108. Such protocol may include any mobile communications technology, e.g., GSM, CDMA, etc., depending upon the technologies supported by a particular wireless service provider to whose service client device 104 is assigned or subscribed. Further, communication link 112 may be implemented utilizing non-cellular technologies such as conventional analog AM or FM radio, Wi-Fi™, wireless local area network (WLAN or IEEE 802.11), WiMAX™, Bluetooth™, hard-wired connections, e.g., cable, phone lines, and other analog and digital wireless voice and data transmission technologies.

Communication links 114A, 114B, . . . , 114N may respectively refer to a communication link enabled by a protocol utilized to transmit data, information, and/or media files between cloud-based platform 108 and subscribers 110A, 110B, . . . , 110N, respectively. Further, communication links 114A, 114B, . . . , 114N may be implemented utilizing one or more of the protocols described above regarding communication link 112.

Communication links 116A and 116B may refer respectively to a communication link enabled by protocol utilized to transmit data, information, and/or media files between client application 106, via client device 104, and subscribers 110A and 110N, respectively. FIG. 1 does not depict connection between client application 106, via client device 104, and subscriber 110N in order to illustrate that the connection between client application 106, via client device 104, may be a peer-to-peer connection, and that a peer-to-peer network may be exclusive to some degree. Regardless, communication links 116A and 116N may be implemented utilizing one or more of the protocols described above regarding communication link 112 and communication links 114A, 114B, . . . , 114N.

Thus, FIG. 1 shows example embodiments of components and communications there between of on-demand information network 100.

Figure 2:
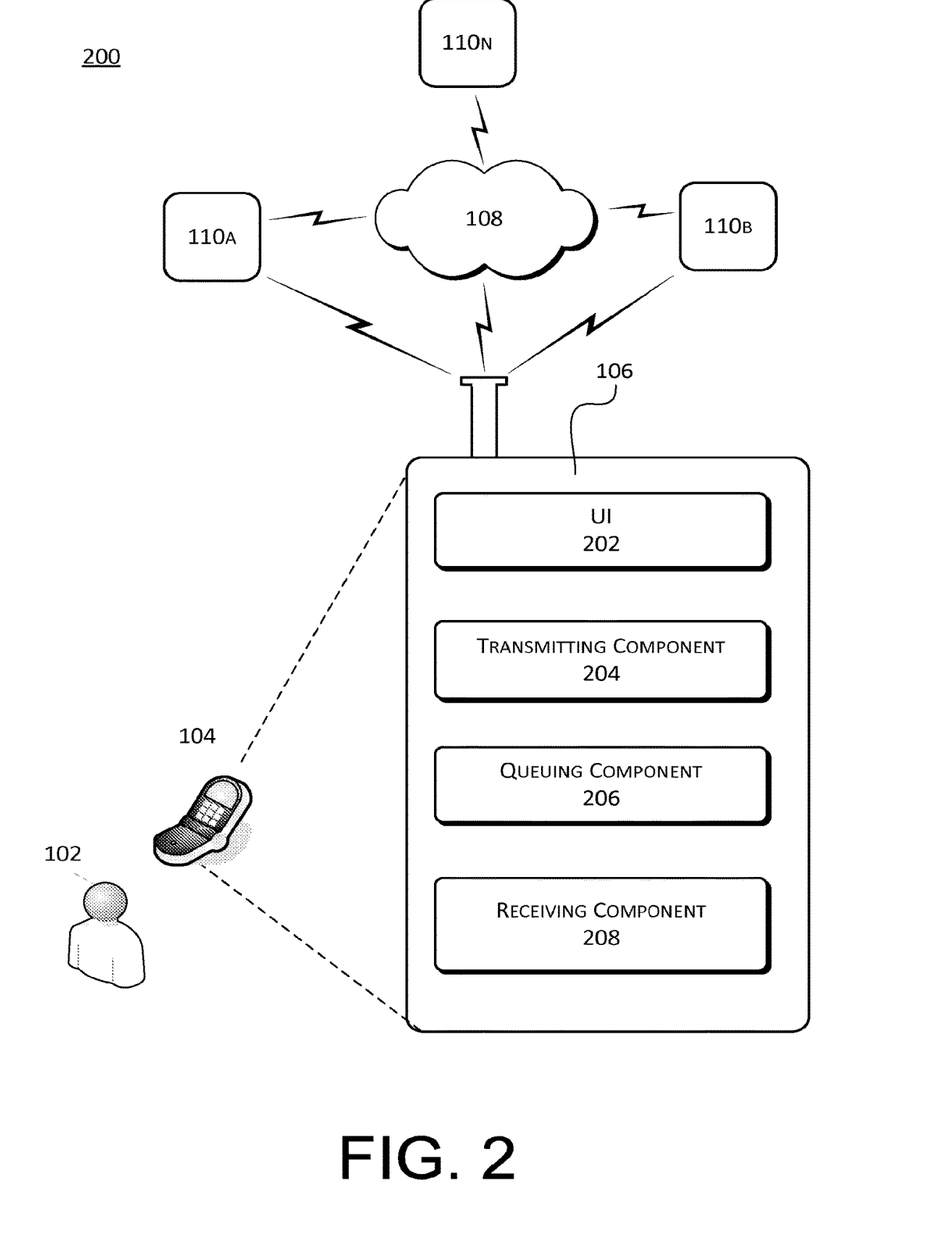
FIG. 2 shows an example configuration of a client device application relative to an on-demand information network, arranged in accordance with at least some embodiments described herein.

FIG. 2 shows an example configuration 200 of a client device application 106 relative to an on-demand information network, arranged in accordance with at least some embodiments described herein. As depicted, an example configuration of client device application 106, hosted on client device 104, includes a user interface (UI) 202, a transmitting component 204, a queuing component 206, and a receiving component 208. In FIG. 2, client device 104 is depicted relative to cloud-based platform 108 and subscribing devices 110A, 110B, . . . , 110N, as in FIG. 1; however, this configuration is an example only, and is not intended to be limiting in any manner.

User interface (UI) 202 may refer to a graphical component of client application 106. UI 202 may be configured, designed, and/or programmed to receive, from user 102, conditions for soliciting competing bids from one or more of subscribers 110A, 110B, . . . , 110N. Accordingly, in the current context, subscribers 110A, 110B, . . . , 110N may be alternatively regarded as "bidders." Further, the conditions for the solicitation of bids for the requested services may include, as non-limiting examples, a requested form of data, information, and/or media files; a location in which to capture the data, information, and/or media files; a time frame in which to capture the data, information, and/or media files; other forms of context for the requested data, information, and/or media files; a price range willing to be paid for the requested data, information, and/or media files; a time frame within which the solicited bids will be accepted, etc.

UI 202 may further be configured, designed, and/or programmed to display bids for providing the requested services, as received from one or more of cloud-based platform 108 or subscribers 110A, 110B, . . . , 110N. More particularly, bids responding to the solicitation from client application 106 via client device 104 may be filtered at cloud-based platform 108; subsequently, bids determined to meet or substantially meet the conditions set forth in the solicitation may be transmitted to client device 104 and displayed to user 102 via UI 202 corresponding to client application 106. Such communications may be facilitated by communication link 112. Alternatively, in a peer-to-peer network environment, client device 104 may receive solicited bids directly from one or more of subscribers 110A and 110B, which may then be displayed to user 102 via UI 202 corresponding to client application 106. Such communications may be facilitated by either of communication links 116A and 116B, with regard to the respective ones of subscribers 110A and 110B.

UI 202 may further be configured, designed, and/or programmed to display data, information, and/or media files, received in accordance with the aforementioned bidding process from one or more of cloud-based platform 108 or subscribers 110A, 110B, . . . , 110N. More particularly, after a bid from one or more of subscribers 110A, 110B, . . . , 110B has been selected by user 102 or client application 106 to provide the requested service, the winning bidder may submit the requested data, information, and/or media files to cloud-based platform 108. Such communications may be facilitated by any of communication links 114A, 114B, . . . , 114N, with regard to respective ones of subscribers 110A, 110B, . . . , 110N. Subsequently, at least previews of the submitted data, information, and/or media files may be transmitted from cloud-based platform 108 to client device 104 and displayed to user via UI 202 corresponding to client application 106. Such communications may be facilitated by communication link 112. Alternatively, in a peer-to-peer network environment, client device 104 may receive at least previews of the requested data, information, and/or media files directly from one or more of subscribers 110A and 110B, which may then be displayed to user 102 via UI 202 corresponding to client application 106. Such communications may be facilitated by either of communication links 116A and 116B, with regard to the respective ones of subscribers 110A and 110B.

As referenced above, the previews of the requested data, information, and/or media files may include portions of written text, thumbnails of photos, video screenshots, portions of an audio, etc.

UI 202 may be still further configured, designed, and/or programmed to enter, for transmission to one or more of cloud-based platform 108 or subscribers 110A, 110B, . . . , 110N, a rating of services provided by the winning bidder who has provided the requested data, information, and/or video files. The ratings may also be stored locally on client device 104 for future use by client application 106. Among multiple purposes, the ratings may be utilized by a filtering component on cloud-based platform 108 or by queuing component on client application 106 to filter future bids from any currently participating bidder.

UI 202 may be configured, designed, and/or programmed as a software module that resides, at least in part, in a memory of client device 104 and which may be executed by one or more processors on client device 104.

Transmitting component 204 may refer to an outbound communication component of client application 106. Transmitting component 204 may be configured, designed, and/or programmed to transmit to cloud-based platform 108 one or more solicitations for competing bids for the requested services from one or more of subscribers 110A, 110B, . . . , 110N based on the input conditions from user 102 via UI 202. More particularly, the transmission of the solicitation for competing bids may be submitted to cloud-based platform 108 from client application 106, via client device 104 facilitated by communication link 112. Alternatively, in a peer-to-peer network environment, the transmission of the solicitation for bids may be transmitted directly to one or more of subscribers 110A and 110B facilitated by either of communication links 116A and 116N, with regard to the respective ones of subscribers 110A and 110B.

Transmitting component 204 may be configured, designed, and/or programmed as a software module that resides, at least in part, in the memory of client device 104 and which may be executed by one or more processors on client device 104.

Queuing component 206 may refer to an interface component of client application 106 that interacts and interfaces with a storage component of client device 104. Accordingly, queuing component 206 may be configured, designed, and/or programmed as a software module that resides, at least in part, in a memory of client device 104 and which may be executed by one or more processors on client device 104. In particular, queuing component 206 may be configured, designed, and/or programmed to store bids from bidders in response to a solicitation for bids for a requested service. The bids may be received from cloud-based platform 108, via communication link 112. Alternatively, in a peer-to-peer networking environment, the bids may be received from one or more of subscribers 110A and 110B, via either of communication links 116A and 116B, with regard to the respective one of subscribers 110A and 110B.

Further, in at least one alternative embodiment, bids received at cloud-based platform 108 may be relayed directly to receiving component 208, and filtering of the received bids may executed by queuing component 206 or some other component corresponding to client device 104 or client application 106 that is configured, designed, and/or programmed for that purpose. Alternatively, in a peer-to-peer networking environment, receiving component 208 may receive bids from one or both of subscribers 110A and 110B and, in accordance with at least some embodiments, filtering of the received bids may executed by queuing component 206 or some other component corresponding to client device 104 or client application 106 that is configured, designed, and/or programmed for that purpose.

Receiving component 208 may refer to an inbound communication component of client application 106. Receiving component 208 may be configured, designed, and/or programmed to receive bids in response to a solicitation of bids for a requested service, from either of cloud-based platform 108 and either of subscribers 110A and 110B and may be further configured, designed, and/or programmed to receive at least a preview of the requested data, information, and/or media files as one or more manifestations of the requested service, again, from either of cloud-based platform 108 and either of subscribers 110A and 110B.

More particularly, receiving component 208 may receive, from cloud-based platform 108, bids from one or more of subscribers 110A, 110B, . . . , 110N that have been filtered in accordance with one or more of, e.g., the respective bids' compliance with the conditions, preferences, or settings of the bid solicitation, the respective bids' competitiveness with each other relative to the conditions of the bid solicitation, ratings of the users respectively associated with subscribers 110A, 110B, . . . , 110N based on past transactions with user 102 or other users that are subscribed to the service hosted by cloud-based platform 108.

Further, receiving component 208 may receive, from cloud-based platform 108, manifestations of the requested service in the form of, e.g., data, information, and/or media files. However, to preserve the integrity of the transactional nature implemented by on-demand information network 100, cloud-based platform 108 may transmit previews of the requested services in the form of portions of written text, thumbnails of photos, video screenshots, portions of an audio, etc. Alternatively, in a peer-to-peer networking environment, receiving component 208 may receive, directly from at least one of subscribers 110A and 110B, the aforementioned previews of the manifestations of the requested services.

Receiving component may be configured, designed, and/or programmed as a software module that resides, at least in part, in a memory of client device 104 and which may be executed by one or more processors on client device 104.

Thus, FIG. 2 shows an example configuration of client application 106, an instance of which is hosted on client device 104, for which one or more embodiments of an on-demand information network may be implemented.

Figure 3:
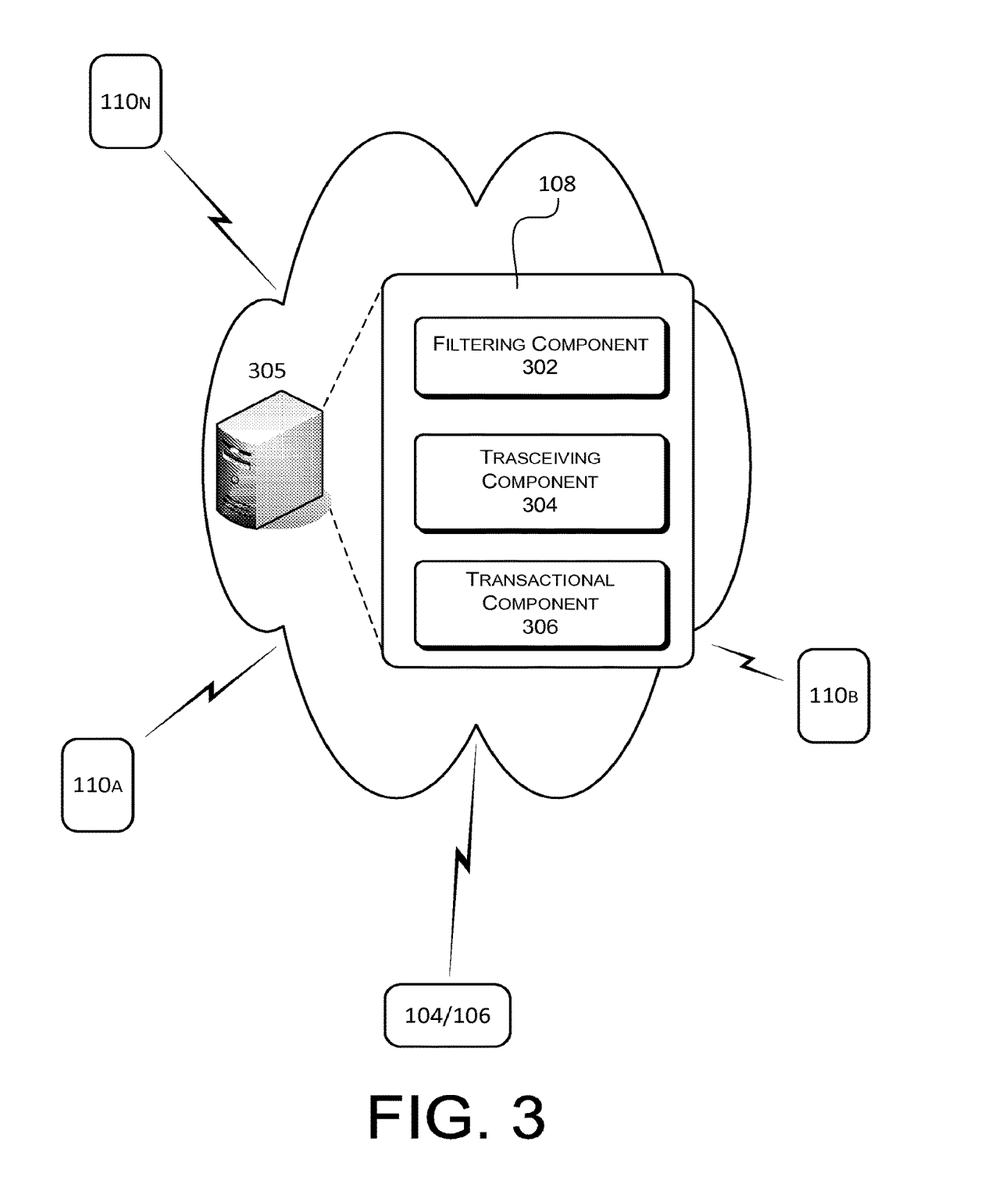
FIG. 3 shows an example configuration of a cloud-based platform relative to an on-demand information network, arranged in accordance with at least some embodiments described herein.

FIG. 3 shows an example configuration 300 of a cloud-based platform 108 relative to an on-demand information network, arranged in accordance with at least some embodiments described herein. As depicted, an example configuration of cloud-based platform 108, hosted on server 305, includes a filtering component 302, a transceiving component 304, and a transactional component 306. In FIG. 3, cloud-based platform 108 hosted on server 305 is depicted relative to client device application 106 hosted on client device 104 as well as subscribing devices 110A, 110B, . . . , 110N, as in FIG. 1; however, this configuration is an example only, and is not intended to be limiting in any manner.

Cloud-based platform 108, as described with reference to FIG. 1, may be regarded as a cloud-based storage and dissemination platform that may include a framework of hardware, software, firmware, or any combination thereof, to which digital data and information, including media files, may be stored or from which they may be shared. Further, cloud-based platform 108 may be implemented by a third-party service provider for realizing a bidding process for the exchange of real-time information.

Cloud-based platform 108 may receive, from client application 106 via client device 104, conditions, preferences or settings entered by user 102 for soliciting competing bids from multiple ones of subscribers 110A, 110B, . . . , 110N for a requested service. The conditions for the solicitation of bids for the requested services may include, as non-limiting examples, a requested form of data, information, and/or media files; a location in which to capture the data, information, and/or media files; a time frame in which to capture the data, information, and/or media files; other forms of context for the requested data, information, and/or media files; a price range willing to be paid for the requested data, information, and/or media files; a time frame within which the solicited bids will be accepted, etc. The reception of such data by cloud-based platform 108 may be facilitated by communication link 112.

Filtering component 302 may refer to a component of cloud-based platform 108 that is configured, designed, and/or programmed to filter the respective bids' compliance with the conditions, preferences, or settings of the solicitation of bids; the respective bids' relative competitiveness relative to the conditions, preferences, or settings of the solicitation of bids; or ratings of the users respectively associated with subscribers 110A, 110B, . . . , 110N based on past transactions with user 102 or any other user subscribed to the service hosted by cloud-based platform 108.

Filtering component 302 may be configured, designed, and/or programmed as a software module that resides, at least in part, a memory of server 305 and which may be executed by one or more processors on server 305.

Transceiving component 304 may refer to an inbound and outbound communication component of cloud-based platform 108. Transceiving component 304 may be configured, designed, and/or programmed to receive, from client application 106 via client device 104, conditions, preferences, and/or settings for soliciting competing bids from multiples ones of subscribers 110A, 110B, . . . , 110N. This reception of data may be facilitated by communication link 112. Further, transceiving component 304 may disseminate the solicitation of bids to one or more of subscribers 110A, 110B, . . . , 110N; and, in response, transceiving component 304 may receive, from one or more of the aforementioned subscribers, at least a preview of data, information, and/or media files as manifestations of the requested service from either of cloud-based platform 108 and any of subscribers 110A, 110B, . . . , 110N. Such communications may be facilitated by any one of communication links 114A, 114B, . . . , 114N, with regard to the respective ones of subscribers 110A, 110B, . . . , 110N.

Transceiving component 304 may be configured, designed, and/or programmed as a software module that resides, at least in part, on the memory of server 305 and which may be executed by one or more processors on server 305.

Transactional component 306 may refer to a payment facilitating component of cloud-based platform 108. Transactional component 306 may be configured, designed, and/or programmed to implement payment to an appropriate one of subscribers 110A, 110B, . . . , 110N that has provided an accepted bid and an accepted manifestation of at least previews the requested services to client application 106 via client device 104. Approval of the manifestation of the requested services may be communicated to transactional component 306 via communication link 112; and approval of payment, which may include providing direct payment or authorization for payment to a third-party payment service, may be communicated via any one of communication links 114A, 114B, . . . , 114N, with regard to a respective one of subscribers 110A, 110B, . . . , 110N.

Transactional component 306 may be implemented as a software module that resides, at least in part, on the memory of server 305 and which may be executed by one or more processors on server 305.

Thus, FIG. 3 shows an example configuration of cloud-based platform 108 through which one or more embodiments of bid solicitation, on-demand dissemination of media files, etc. may be implemented.

Figure 4:
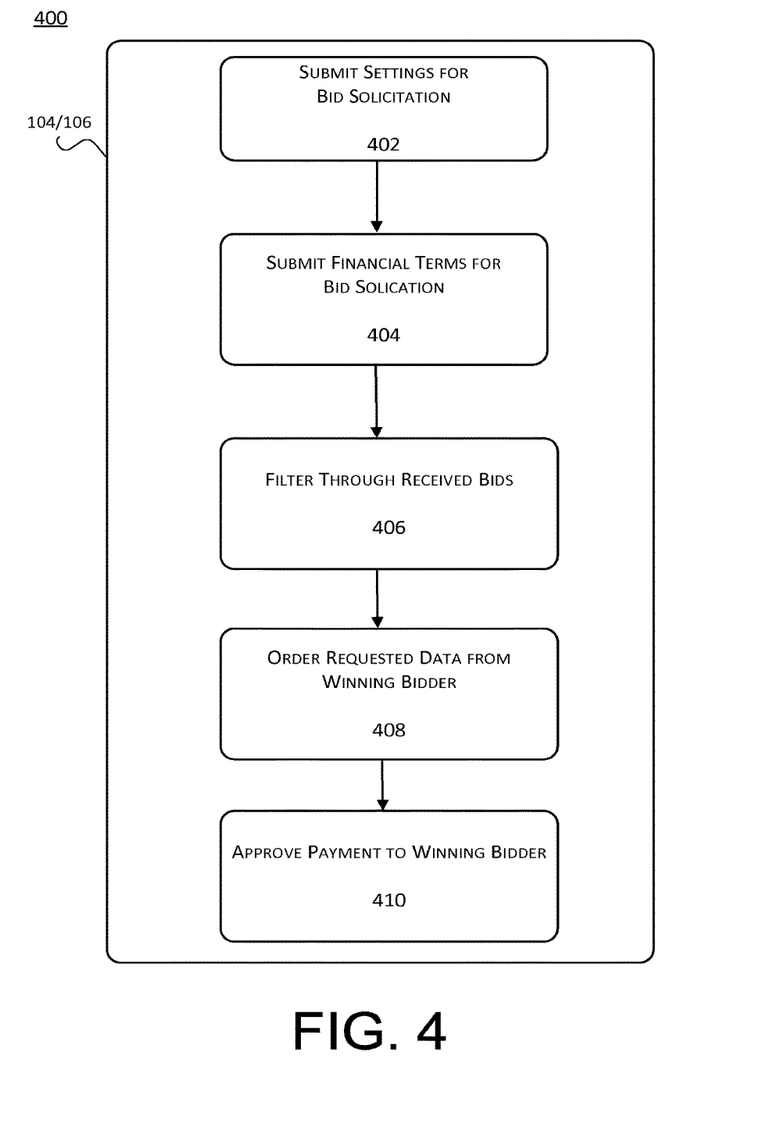
FIG. 4 shows an example configuration of a processing flow of operations implemented by a client device application relative to an on-demand information network, in accordance with at least some embodiments described herein.

FIG. 4 shows an example configuration of a processing flow 400 of operations implemented by a client device application relative to an on-demand information network, in accordance with at least some embodiments described herein. Processing flow 400 includes sub-processes executed by various components that are part of client device application 106 hosted on client device 104. However, processing flow 400 is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow 400 may include various operations, functions, or actions as illustrated by one or more of blocks 402, 404, 406, 408, and/or 410. Processing may begin at block 402.

Block 402 (Submit Settings for Bid Solicitation) may refer to transmitting component 204, in coordination with cloud-based platform 108, submitting or configuring conditions, preferences, or settings entered by user 102 for soliciting competing bids from multiple ones of subscribers 110A, 110B, . . . , 110N for a requested service. The conditions for the solicitation of bids for the requested services may include, as non-limiting examples, a requested form of data, information, and/or media files; a location in which to capture the data, information, and/or media files; a time frame in which to capture the data, information, and/or media files; other forms of context for the requested data, information, and/or media files; a price range willing to be paid for the requested data, information, and/or media files; a time frame within which the solicited bids will be accepted, etc. Such communication may be facilitated by communication link 112. Processing may continue from block 402 to block 404.

Block 404 (Submit Financial Terms for Bid Solicitation) may refer to transmitting component 204, in coordination with cloud-based platform 108, submitting or configuring financial parameters for a bid to be deemed successful, in response to the aforementioned solicitation of bids, by any one of subscribers 110A, 110B, . . . , 110N for the requested service. Operations associated with block 404 may be combined with those of block 402, although implementation of either may be a matter of customization or preference in accordance with settings of client application 106. Such communication may be facilitated by communication link 112. Processing may continue from block 404 to block 406.

Block 406 (Filter Through Received Bids) may refer to receiving component 208 receiving received bids that have been filtered at cloud-based platform 108; alternatively, in a peer-to-peer networking environment, block 406 may refer to receiving component 208 receiving bids directly from one or both of subscribers 110A and 110B and filtering those received bids locally.

In at least one embodiment, upon the dissemination of the solicitation of bids from cloud-based platform 108, one or more of subscribers 110A, 110B, . . . , 110N may submit bids back to cloud-based platform 108. Such communication may be facilitated by one or more of communication links 114A, 114B, . . . , 114N with regard to a respective one of subscribers 110A, 110B, . . . , 110N. Accordingly, filtering component 302 may filter the received bids in accordance with the conditions, preferences, or settings submitted with regard to block 402. Alternative embodiments may include filtering component 302 further filtering the received bids in accordance with ratings of the users respectively associated with subscribers 110A, 110B, . . . , 110N based on past transactions with user 102, client application 106, or other users that are subscribed to the service hosted by cloud-based platform 108. The filtering based on ratings may compliment filtering based on the conditions, preferences, or settings of the bid solicitation; or the filtering based on ratings may replace filtering based on the conditions, preferences, or settings of the bid solicitation. Such communication may be facilitated by communication link 112.

In at least one alternative embodiment, the bids received at cloud-based platform 108 may be relayed directly to client application 106 via client device 104, and filtering of the received bids may be executed by queuing component 206 or some other component corresponding to client device 104 or client application 106 in the same manner described above with regard to filtering component 302. Such communication may be facilitated by communication link 112. Alternatively, in a peer-to-peer networking environment, client application via client device 104 may receive bids from one or both of subscribers 110A and 110B and, filtering of the received bids may executed by queuing component 206 or some other component corresponding to client device 104 or client application 106. Such communication may be facilitated by one or more of communication links 116A and 116B, with regard to a respective one of subscribers 110A and 110B. Processing may continue from block 406 to block 408.

Block 408 (Order Requested Data from Winning Bidder) may refer to transmitting component 204 transmitting a preference for one or more of subscribers 110A, 110B, . . . , 110N that have been filtered as having best accommodated the conditions, preferences, or settings provided in the solicitation of bids. Dissemination of the order to the winning or preferred bidder may be facilitated by one or more of communication links 114A, 114B, . . . , 114N with regard to a respective one of subscribers 110A, 110B, . . . , 110N. Alternatively, in a peer-to-peer networking environment, the dissemination of the order to the winning or preferred bidder may facilitated by one or more of communication links 116A and 116B, with regard to a respective one of subscribers 110A and 110B. Processing may continue from block 408 to block 410.

Block 410 (Approve Payment to Winning Bidder) may refer to transmitting component 204, in coordination with cloud-based platform 108, communicating approval of the received manifestation of the requested services and approving payment therefore based on the financial terms set forth in the solicitation of bids. Such communication may be facilitated by communication link 112. Alternatively, in a peer-to-peer networking environment, the acceptance of the received manifestation of the requested services may be facilitated by one or more of communication links 116A and 116B with regard to a respective one of subscriber 110A and 110B, though payment may be facilitated via a third-party payment service.

Thus, FIG. 4 shows an example processing flow implemented by client application 106, an instance of which is hosted on client device 104, for implementing one or more embodiments of an on-demand information network.

Figure 5:
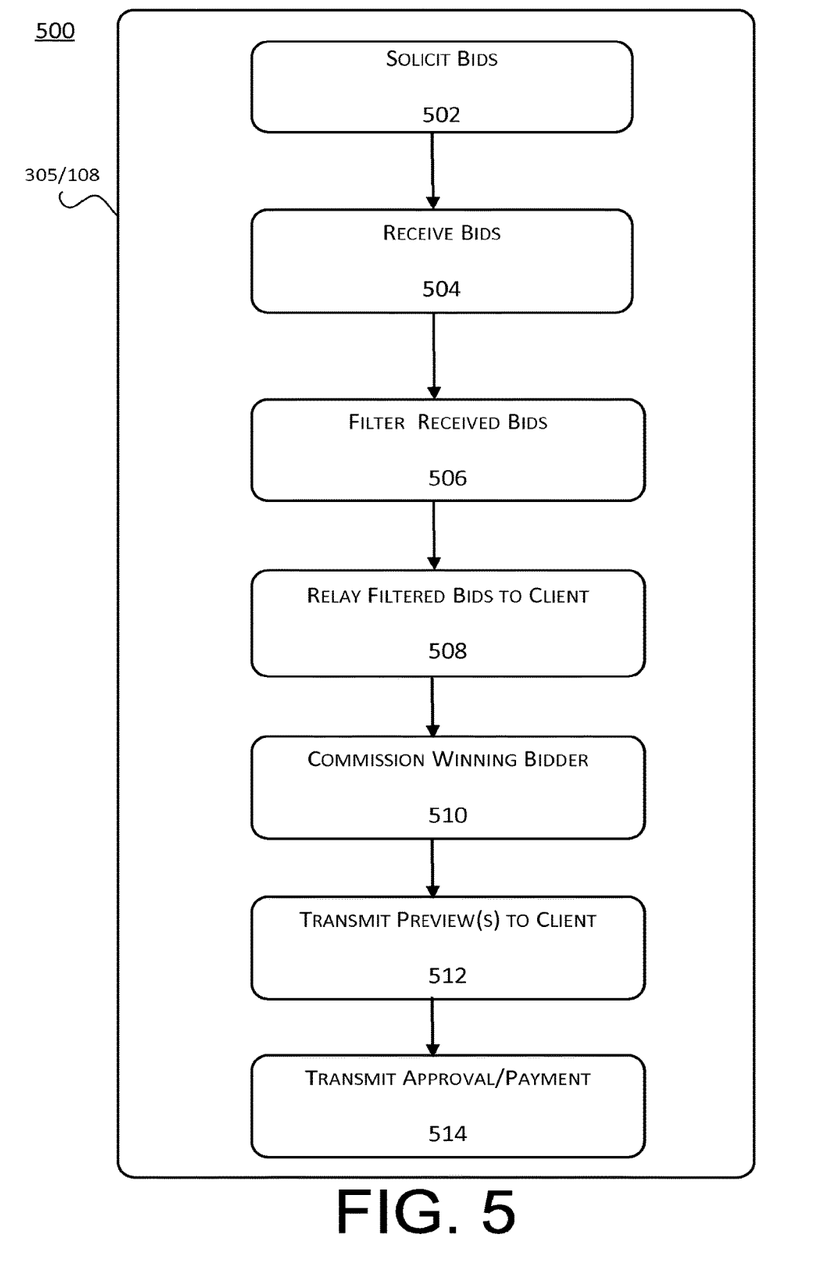
FIG. 5 shows an example processing flow of operations implemented by a cloud-based platform relative to an on-demand information network, in accordance with at least some embodiments described herein.

FIG. 5 shows an example processing flow 500 of operations implemented by a cloud-based platform relative to an on-demand information network, in accordance with at least some embodiments described herein. Processing flow 500 includes sub-processes executed by various components that are part of cloud-based platform 108 hosted on server 305. However, processing flow 500 is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow 500 may include various operations, functions, or actions as illustrated by one or more of blocks 502, 504, 506, 508, 510, 512, and/or 514. Processing may begin at block 502.

Block 502 (Solicit Bids) may refer to transceiving component 304 disseminating a solicitation for bids to provide services requested by client application 106 via client device 104 to one or more of subscribers 110A, 110B, . . . , 110N. Such communication may be facilitated by one or more of communication links 114A, 114B, . . . , 114N with regard to a respective one of subscribers 110A, 110B, . . . , 110N. Processing may continue from block 502 to block 504.

Block 504 (Receive Bids) may refer to transceiving component 304 receiving the solicited bids from one or more of one or more of subscribers 110A, 110B, . . . , 110N. Such communication may be facilitated by one or more of communication links 114A, 114B, . . . , 114N with regard to a respective one of subscribers 110A, 110B, . . . , 110N. Processing may continue from block 504 to block 506.

Block 506 (Filter Received Bids) may refer to filtering component 302 filtering through the received bids' compliance with the conditions, preferences, or settings of the solicitation of bids; the respective bids' competitiveness relative to each other; and/or ratings of the users respectively associated with subscribers 110A, 110B, . . . , 110N based on past transactions with user 102 or other user subscribed to the service hosted by cloud-based platform 108. In at least on alternative embodiment, though, cloud-based platform 108 may directly relay the received bids to client application 106 via client device 104, facilitated by communication link 112. In those alternative embodiments, block 506 may be bypassed. Processing may continue from block 506 to block 508.

Block 508 (Relay Filtered Bids to Client) may refer to transceiving component 304 transmitting the filtered bids to client application 106 via client device 104, facilitated by communication link 112. Processing may continue from block 508 to block 510.

Block 510 (Commission Winning Bids) may refer to transceiving component 304, upon receiving an appropriate communication from client application 106 via client device 104, disseminating the order to the winning or preferred bidder, facilitated by one or more of communication links 114A, 114B, . . . , 114N with regard to a respective one of subscribers 110A, 110B, . . . , 110N. Processing may continue from block 510 to block 512.

Block 512 (Transmit Preview(s) to Client) may refer to transceiving component 304 transmitting to client application 106 via client device 104, facilitated by communication link 112, at least previews of the requested data, information, and/or media files received from the one or more winning or preferred bidders. As referenced above, the previews of the requested data, information, and/or media files may include portions of written text, thumbnails of photos, video screen-shots, portions of an audio, etc. Processing may proceed from block 512 to block 514.

Block 514 (Transmit Approval/Payment) may refer to transactional component 306, upon receiving approval from client application 106 via client device 104, implementing payment to the winning or preferred bidder that has provided at least the preview of the manifestation of the requested services. Approval of the manifestation of the requested services may be communicated to transactional component 306 via communication link 112; and approval of payment, which may include providing direct payment or authorization for payment to a third-party payment service, may be communicated via any one of communication links 114A, 114B, . . . , 114N, in with regard to a respective one of subscribers 110A, 110B, . . . , 110N.

Thus, FIG. 5 shows an example processing flow implemented by cloud-based platform 108 for implementing one or more embodiments of an on-demand information network.

Figure 6:
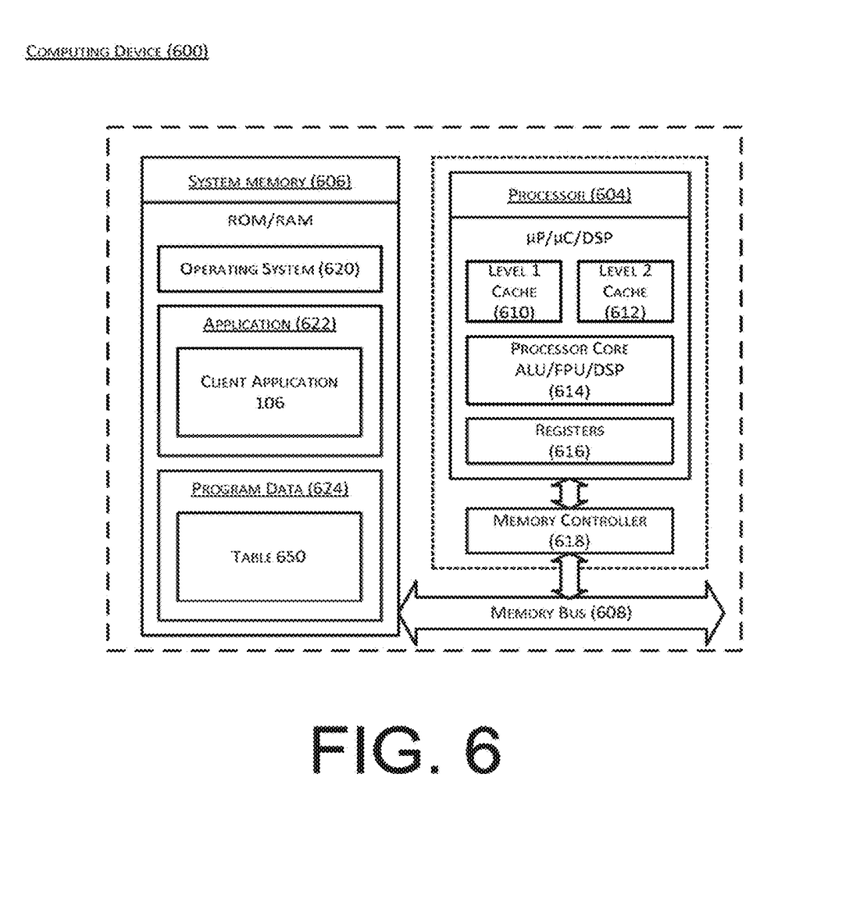
FIG. 6 shows a block diagram illustrating an example computing device by which various example solutions described herein may be implemented, arranged in accordance with at least some embodiments described herein.

FIG. 6 shows a block diagram illustrating an example computing device 600 by which various example solutions described herein may be implemented, arranged in accordance with at least some embodiments described herein.

More particularly, FIG. 6 shows an illustrative computing embodiment, in which any of the processes and sub-processes described herein may be implemented as computer-readable instructions stored on a computer-readable medium. The computer-readable instructions may, for example, be executed by a processor of client device 104, subscribers 110A, 110B, . . . , 110N, or server 305 having a network element and/or any other computing device corresponding thereto, particularly as applicable to the applications and/or programs described above corresponding to the configuration 100 for implementing one or more embodiments of an on-demand information network.

In a very basic configuration, a computing device 600 may typically include one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. Processor 604 may include one or more levels of caching (such as a level 1 cache 610 and a level 2 cache 612), a processor core 614, and registers 616. Processor core 614 may include an arithmetic logic unit (ALU), a floating point unit (FPU), or a digital signal processor. A memory controller 618 may be coupled to processor core 604 and memory bus 608.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624.

Application 622 may be configured to transmit or receive identification information pertaining to client device 104, subscribers 110A, 110B, . . . , 110N, or server 305; verify or validate such identifying data; and transmit such information as described previously with respect to FIGS. 1-5. Program data 624 may include a table 650, which may be useful for implementing actuation of appropriate components or modules as described herein.

System memory 606 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

The network communication links 112, 114A, 114B, . . . , 114N, 116A, and 116B may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disk (CD), a digital versatile disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method to share a media file over an on-demand information network, the method comprising, by a computing system:
    receiving a request for the media file sent from a client device over the on-demand information network;
    configuring an on-demand information network solicitation for the requested media file, wherein the on-demand information network solicitation specifies conditions for candidate media files to fulfill the request, and wherein the specified conditions include a particular form of the candidate media files and a time frame, subsequent to the on-demand information network solicitation by the computing system, within which to capture content of the candidate media files;
    soliciting, over the on-demand information network, one or more subscribers to a service hosted by the computing system and that use associated electronic subscriber devices, to provide the candidate media files to the computing system over the on-demand information network in accordance with the specified conditions;
    receiving one or more responses to the soliciting, wherein the one or more responses are sent from one or more of the electronic subscriber devices over the on-demand information network, and wherein the one or more responses include information of one or more candidate media files to fulfill the request;
    filtering the one or more responses by comparing the information of the one or more candidate media files to the specified conditions;
    generating one or more filtered responses that include information of the one or more candidate media files that pass the filtering by meeting the specified conditions;
    transmitting the one or more filtered responses to the client device over the on-demand information network;
    receiving, from the client device over the on-demand information network, an indication that a particular response of the one or more filtered responses includes information of a candidate media file to fulfill the request;

transmitting over the on-demand information network to a subscriber associated with a subscriber device that sent the particular response, an order for the candidate media file to fulfill the request;

receiving, over the on-demand information network, the ordered media file which is sent by the subscriber associated with the subscriber device that sent the particular response;

manifesting the received ordered media file as a preview of the ordered media file in the particular form of the candidate media files;

transmitting the manifested preview to the client device over the on-demand information network;

receiving approval of the manifested preview, wherein the approval is sent from the client device over the on-demand information network; and in response to the receiving approval of the manifested preview, implementing payment for the ordered media file, wherein specification of the time frame within which to capture content of the candidate media file, specification of the particular form for the candidate media files, and the manifesting the preview in the particular form, in combination, fulfill the request for the media file.

2. The method of claim 1, wherein the specified conditions include a rating of the one or more subscribers based on past service provided by the one or more subscribers.

3. The method of claim 1, wherein the specified conditions include, at least, a location in which to capture the candidate media files.

4. The method of claim 1, wherein the specified conditions include, at least, a price range to be included in responses to the on-demand information network solicitation.

5. The method of claim 1, further comprising:
registering a user of the client device and the one or more subscribers to the service, wherein the service is hosted on a cloud-based platform that includes the computing system.

6. A non-transitory computer-readable medium having stored therein executable instructions that, in response to execution, cause one or more processors of a computing system to perform or control performance of operations that comprise:

configure an on-demand information network solicitation for a requested media file, wherein a request for the media file is sent from a client device over an on-demand information network, wherein the on-demand information network solicitation specifies conditions for candidate media files to fulfill the request, and wherein the specified conditions include a particular form of the candidate media files and a time frame, subsequent to the on-demand information network solicitation within which to capture content of the candidate media files;

solicit, over the on-demand information network, one or more electronic subscriber devices that subscribe to a service hosted by the computing system, to provide the candidate media files to the computing system over the on-demand information network in accordance with the specified conditions;

filter one or more responses, , which are sent from the one or more electronic subscriber devices and which include information of one or more candidate media files, by comparison of the information of the one or more candidate media files to the specified conditions;

transmit the one or more filtered responses to the client device over the on-demand information network, wherein the one or more filtered responses correspond to one or more candidate media files that meet the specified conditions and wherein the transmission is performed to obtain an indication from the client device as to which particular response of the one or more filtered responses corresponds to a candidate media file to fulfill the request;

transmit, over the on-demand information network to a subscriber device that sent the particular response, an order for the candidate media file to fulfill the request;

in response to receipt of the order media file, manifest the received ordered media file as a preview of the ordered media file in the particular form;

transmit the manifested preview to the client device over the on-demand information network; and in response to receipt, from the client device over the on-demand information network, of approval of the manifested preview, implement payment for the ordered media file, wherein specification of the content time frame within which to capture content of the candidate media files, specification of the particular form for the candidate media files, and the manifestation of the preview, in combination, fulfill the request for the media file.

7. The non-transitory computer-readable medium of claim 6, wherein the specified conditions include a rating of one or more subscribers based on past service provided by the one or more subscribers, and wherein the one or more subscribers are associated with the one or more electronic subscriber devices.

8. The non-transitory computer-readable medium of claim 6, wherein the operations further comprise at least one operation to:
register a user of the client device and subscribers associated with the one or more electronic subscriber devices to the service, wherein the service is hosted on a cloud-based platform.

9. The non-transitory computer-readable medium of claim 6, wherein the operations further comprise at least one operation to:
transmit a confirmation message over the on-demand information network to the subscriber device that sent the particular response.

10. The non-transitory computer-readable medium of claim 6, wherein the specified conditions include, at least, a location in which to capture the candidate media files.

11. The non-transitory computer-readable medium of claim 6, wherein the specified conditions include, at least, a price range to be included in responses to the on-demand information network solicitation.

12. A method to share a media file over an on-demand information network, the method comprising, by a computing system:

configuring a solicitation for a requested media file, wherein a request for the media file is sent from a client device over the on-demand information network, wherein the solicitation specifies conditions for candidate media files to fulfill the request, and wherein the specified conditions include a particular form of the candidate media files and a time frame, subsequent to the solicitation, within which to capture content of the candidate media files;

soliciting, via the solicitation and over the on-demand information network, one or more electronic subscriber devices that subscribe to a service hosted by the computing system, to provide the candidate media files to the computing system over the on-demand information network;

filtering one or more responses, which are sent from the one or more electronic subscriber devices in response to the solicitation and which include information of one or more candidate media files, by comparing the information of the one or more candidate media files to the specified conditions;

transmitting the one or more filtered responses to the client device over the on-demand information network, wherein the one or more filtered responses correspond to one or more candidate media files that meet the specified conditions, and wherein the transmission is performed to obtain an indication from the client device as to which particular response of the one or more filtered responses corresponds to a candidate media file to fulfill the request;

transmitting, in response to the obtained indication and over the on-demand information network to a subscriber device that sent the particular response, an order for the candidate media file to fulfill the request;

in response to receipt of the ordered media file, manifesting the received ordered media file as a preview of the ordered media file in the particular form;

transmitting the manifested preview to the client device over the on-demand information network; and in response to receipt, from the client device over the on-demand information network, of approval of the manifested preview, implementing payment for the ordered media file, wherein specification of the time frame within which to capture content of the candidate media files, specification of the particular form for the candidate media files, and the manifestation of the preview, in combination, fulfill the request for the media file.

13. The method of claim 12, further comprising: registering a user of the client device and the one or more subscribers to the service, wherein the service is hosted on a cloud-based platform that includes the computing system.

14. The method of claim 12, further comprising:
transmitting a confirmation message over the on-demand information network to the subscriber device that sent the particular response.

* * * * *

UNITED STATES PATENT AND TRADEMARK OFFICE
CERTIFICATE OF CORRECTION

PATENT NO. : 9,760,926 B2  Page 1 of 1
APPLICATION NO. : 13/810818
DATED : September 12, 2017
INVENTOR(S) : Suciu et al.

It is certified that error appears in the above-identified patent and that said Letters Patent is hereby corrected as shown below:

In the Specification

In Column 15, Line 45, delete "recitation no" and insert -- recitation, no --, therefor.

In Column 15, Line 67, delete "general such" and insert -- general, such --, therefor.

In Column 16, Line 7, delete "general such" and insert -- general, such --, therefor.

In the Claims

In Column 17, Line 4, in Claim 1, delete "transmitting over" and insert -- transmitting, over --, therefor.

In Column 17, Line 24, in Claim 1, delete "media file," and insert -- media files, --, therefor.

In Column 17, Line 65, in Claim 6, delete "responses, , which" and insert -- responses, which --, therefor.

In Column 18, Line 16, in Claim 6, delete "the order media" and insert -- the ordered media --, therefor.

In Column 18, Line 25, in Claim 6, delete "the content time" and insert -- the time --, therefor.

Signed and Sealed this
Eighth Day of May, 2018

Andrei Iancu
*Director of the United States Patent and Trademark Office*